(12) United States Patent
Kim et al.

(10) Patent No.: US 8,629,950 B2
(45) Date of Patent: Jan. 14, 2014

(54) ARRAY SUBSTRATE AND DISPLAY DEVICE HAVING THE SAME

(75) Inventors: Dong-Gyu Kim, Yongin-si (KR);
Sang-Soo Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 190 days.

(21) Appl. No.: 12/435,641

(22) Filed: May 5, 2009

(65) Prior Publication Data

US 2009/0284673 A1    Nov. 19, 2009

(30) Foreign Application Priority Data

May 13, 2008   (KR) ................. 2008-44140

(51) Int. Cl.
*G02F 1/1368* (2006.01)
*G02F 1/1343* (2006.01)

(52) U.S. Cl.
USPC ............................ 349/48; 349/108

(58) Field of Classification Search
USPC .................... 349/48, 106
See application file for complete search history.

(56) References Cited

U.S. PATENT DOCUMENTS

| | | | |
|---|---|---|---|
| 7,113,241 B2 | 9/2006 | Hanaoka | |
| 7,145,622 B2 | 12/2006 | Kataoka et al. | |
| 7,277,149 B2* | 10/2007 | Kim et al. | 349/141 |
| 8,130,346 B2* | 3/2012 | Tien et al. | 349/110 |
| 2003/0043336 A1 | 3/2003 | Sasaki et al. | |
| 2005/0276088 A1 | 12/2005 | Moon et al. | |
| 2008/0074587 A1* | 3/2008 | Tien et al. | 349/106 |
| 2008/0174712 A1* | 7/2008 | Kim et al. | 349/48 |

FOREIGN PATENT DOCUMENTS

| | | |
|---|---|---|
| JP | 2003149647 A | 5/2003 |
| JP | 2005352483 A | 12/2005 |
| JP | 2007256906 A | 10/2007 |

OTHER PUBLICATIONS

European Search Report for 09006165.6-2205 dated Aug. 14, 2009.
European Office Action for Application No. 09 006 165.6-2205 dated Oct. 18, 2011.
European Office Action/Examination for Application No. 09 006 165.6—2205 dated Jul. 25, 2012.

* cited by examiner

*Primary Examiner* — Eric Wong
(74) *Attorney, Agent, or Firm* — Cantor Colburn LLP

(57) ABSTRACT

An array substrate includes a base substrate, a gate line, a data line, a switching element and a pixel electrode. The gate line extends in a first direction on the base substrate. The data line extends in a second direction, substantially perpendicular to the first direction, on the base substrate. The switching element is electrically connected to the gate line and the data line. The pixel electrode includes a first sub-pixel electrode having first slit patterns formed thereon, and a second sub-pixel adjacent to the first sub-pixel electrode and having second slit patterns formed thereon. The first slit patterns and the second slit patterns are electrically connected to the switching element, the first slit patterns are disposed in parallel with each other in a third direction, and the second slit patterns are disposed in parallel with each other in a fourth direction different than third direction.

17 Claims, 9 Drawing Sheets

ARRAY SUBSTRATE AND DISPLAY DEVICE HAVING THE SAME

This application claims priority to Korean Patent Application No. 2008-44140, filed on May 13, 2008, and all the benefits accruing therefrom under 35 U.S.C. §119, the contents of which in its entirety are herein incorporated by reference.

BACKGROUND OF THE INVENTION

1. Field of the Invention

The present invention relates to an array substrate and a display device having the array substrate. More particularly, the present invention relates to an array substrate which controls vertically aligned liquid crystal molecules using an electrode having a slit pattern formed thereon, and a display device having the array substrate.

2. Description of the Related Art

A liquid crystal display ("LCD") device is a type of flat panel display ("FPD") device which is widely used. The LCD device typically includes a first display substrate, a second display substrate disposed opposite to, e.g., facing, the first display substrate and a liquid crystal layer interposed therebetween. When an electric field is applied to the liquid crystal layer, an arrangement of liquid crystal molecules in the liquid crystal layer is altered. As a result, an optical transmissivity of light through the liquid crystal layer is controlled, and an image is thereby displayed on the LCD device.

The first display substrate and the second display substrate of the LCD device typically include respective electric field-generating electrodes disposed thereon. Specifically, pixel electrodes are arranged on the first display substrate in a substantially matrix pattern, and a common electrode is formed on an entire surface of the second display substrate. In the LCD device, the image is displayed by applying a separate voltage to each pixel electrode. As a result, a thin-film transistor ("TFT") for switching the separate voltage applied to each of the pixel electrodes is connected to each of the pixel electrodes. More specifically, a gate line which transmits a signal for controlling a switching operation of the TFT is formed on the first substrate, and a data line which transmits a voltage to each of the pixel electrodes is formed on the first substrate.

A viewing angle of the LCD device is generally lower than, e.g., narrower than, viewing angles of other types of display devices. In attempts to increase, e.g., improve, the viewing angle of the LCD device, various technologies have been developed. For example, liquid crystal molecules may be vertically aligned with respect to a plane defined by the first display substrate and the second display substrate, and a slit pattern or a protrusion pattern is formed on the pixel electrode and/or the common electrode, thereby dividing the pixel into a multi-domain structure having multiple viewing angles.

To increase the number of domains in a unit pixel of the multi-domain structure, the pixel electrode may be further divided into sub-pixel electrodes. In operation utilizing a charge-sharing driving method, for example, pixel voltages having different levels are applied to the sub-pixel electrodes.

However, in the multi-domain structure, and particularly in multi-domain structures including four or more domains per unit pixel when the sub-pixel electrodes are formed in one unit pixel, required numbers of switching elements, data lines and gate lines are increased, thereby substantially decreasing an aperture ratio of the unit pixel, resulting in a substantial degradation of an image quality of the LCD device.

BRIEF SUMMARY OF THE INVENTION

Exemplary embodiments of the present invention provide an array substrate having a substantially enhanced aperture ratio and a substantially improved viewing angle.

Exemplary embodiments of the present invention also provide a display device having the array substrate and a method of driving the display device.

According to an exemplary embodiment of the present invention, an array substrate includes a base substrate, a gate line, a data line, a switching element and a pixel electrode. The gate line extends in a first direction on the base substrate. The data line extends in a second direction, substantially perpendicular to the first direction, on the base substrate. The switching element is electrically connected to the gate line and the data line. The pixel electrode includes a first sub-pixel electrode having first slit patterns formed thereon and a second sub-pixel adjacent to the first sub-pixel electrode and having second slit patterns formed thereon. The first slit patterns and the second slit patterns are electrically connected to the switching element, the first slit patterns are disposed in parallel with each other in a third direction, and the second slit patterns are disposed in parallel with each other in a fourth direction different than third direction.

In an exemplary embodiment of the present invention, the array substrate further includes a longitudinal electrode bar disposed on the base substrate in the second direction, and the first slit patterns extend in the third direction to connect to the longitudinal electrode bar. The second slit patterns extend in the fourth direction to connect to the longitudinal electrode bar.

In an exemplary embodiment of the present invention, the array substrate further includes a horizontal electrode bar disposed on the base substrate in the first direction proximate to the gate line, wherein the horizontal electrode bar is electrically connected to an output electrode of the switching element.

The first slit patterns and the second slit patterns may be alternately disposed in sequential unit pixels along each of the first direction and the second direction.

In an alternative exemplary embodiment of the present invention, the switching element and the pixel electrode may form a unit pixel, and the switching element and the pixel electrode form a unit pixel, and eight unit pixels are disposed adjacent to each other in a matrix having two rows and four columns to form a pixel unit.

In an exemplary embodiment of the present invention, the array substrate may further include a longitudinal electrode bar disposed on the base substrate in the second direction, and one of the first slit patterns and the second slit patterns may extend in one of the third direction and the fourth direction, respectively, to connect to the longitudinal electrode bar.

In an exemplary embodiment of the present invention, the array substrate may further include a plurality of longitudinal electrode bars. A first longitudinal electrode bar of the plurality of longitudinal electrode bars may be disposed in a first row of the matrix adjacent to a left peripheral data line, a second longitudinal electrode bar of the plurality of longitudinal electrode bars may be disposed in a second row of the matrix adjacent to a right peripheral data line, and the first slit pattern and the second slit pattern may be disposed in an alternating arrangement along each of the row direction and the column direction.

According to an alternative exemplary embodiment of the present invention, a display device includes an array substrate, an opposite substrate and a liquid crystal layer. The array substrate includes a base substrate, a gate line, a data line, a switching element and a pixel electrode. The gate line extends in a first direction on the base substrate. The data line extends in a second direction, substantially perpendicular to the first direction, on the base substrate. The switching element is electrically connected to the gate line and the data line. The pixel electrode includes a first sub-pixel electrode having first slit patterns formed thereon and a second sub-pixel adjacent to the first sub-pixel electrode and having second slit patterns formed thereon. The first slit patterns and the second slit patterns are electrically connected to the switching element, the first slit patterns are disposed in parallel with each other in a third direction, and the second slit patterns are disposed in parallel with each other in a fourth direction different than third direction. The opposite substrate includes a common electrode opposite to the pixel electrode. The liquid crystal layer is vertically aligned and is disposed between the array substrate and the opposite substrate.

In an exemplary embodiment of the present invention, the switching element and the pixel electrode may form a unit pixel. Four unit pixels are disposed adjacent to each other in a matrix having two rows and two columns to form a pixel unit.

In an exemplary embodiment of the present invention, the display device may further include a driving apparatus. The driving apparatus alternatively applies a first pixel voltage greater than a gradation of an image and a second pixel voltage less than the gradation of the image to the data line, wherein the number of domains displayed by the pixel unit is twice the number of domains of the liquid crystal layer.

Each of the pixel units forms eight domains includes different liquid crystal arrangement directions, based on an operation of the driving apparatus.

In an exemplary embodiment of the present invention, the display device further includes a longitudinal electrode bar disposed at a boundary between the first slit patterns and the second slit patterns. The first slit pattern and the second slit pattern determine an alignment direction of liquid crystal molecules in the liquid crystal layer, and the alignment direction of the liquid crystal molecules toward the longitudinal electrode bar. A slit width of the first slit patterns and the second slit patterns is less than a thickness of the liquid crystal layer.

In an exemplary embodiment of the present invention, the first slit patterns and the second slit patterns are sequentially alternately disposed in sequential unit pixels along each of the first direction and the second direction.

In an exemplary embodiment of the present invention, the driving apparatus drives unit pixels in a first row of the matrix by dot inversion based on the first pixel voltage and unit pixels in a second row of the matrix based on the second pixel voltage to display the image.

In an exemplary embodiment of the present invention, the opposite substrate may further include a color filter disposed on the common electrode. The color filter may include a red color filter, a green color filter and a blue color filter.

In another alternative exemplary embodiment of the present invention, the switching element and the pixel electrode may form a unit pixel. Eight unit pixels are disposed adjacent to each other in a matrix having two rows and four columns to form a pixel unit. The second slit pattern and the first slit pattern are sequentially alternately disposed in the first direction in a first row of the matrix, and the first slit pattern and the second slit pattern are sequentially alternately disposed in the first direction in a second row of the matrix.

In yet another alternative exemplary embodiment of the present invention, a method of driving a display device is provided. The display device includes an array substrate, an opposite substrate and a liquid crystal layer disposed therebetween. The array substrate includes a pixel electrode having a first sub-pixel electrode including first slit patterns formed thereon and a second sub-pixel adjacent to the first sub-pixel electrode and having second slit patterns formed thereon. The method includes applying a first pixel voltage greater than a gradation of an image to the pixel electrode and applying a second pixel voltage less than the gradation of the image to the pixel electrode. The number of domains displayed by a pixel unit is twice the number of domains of the liquid crystal layer.

The switching element and the pixel electrode may form a unit pixel, and four unit pixels are disposed adjacent to each other in a substantially matrix pattern having two rows and two columns to form a pixel unit. Alternatively, eight unit pixels may be disposed adjacent to each other in a substantially matrix pattern having two rows and four columns to form a pixel unit.

Thus, in an array substrate and a display device having the array substrate in accordance with exemplary embodiments of the present invention, first-column unit pixels are driven by a first pixel voltage, and second-row unit pixels are driven by a second pixel voltage. Therefore, when a pixel unit having four liquid crystal alignment directions is driven by the first pixel voltage and the second pixel voltage, eight domains are realized. Thus, an aperture ratio of the unit pixel is substantially increased. Moreover, eight domains correspond to eight directions of viewing angles which differ by about 45 degrees each. Therefore, a viewing angle of the display device according to an exemplary embodiment of the present invention is substantially increased.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
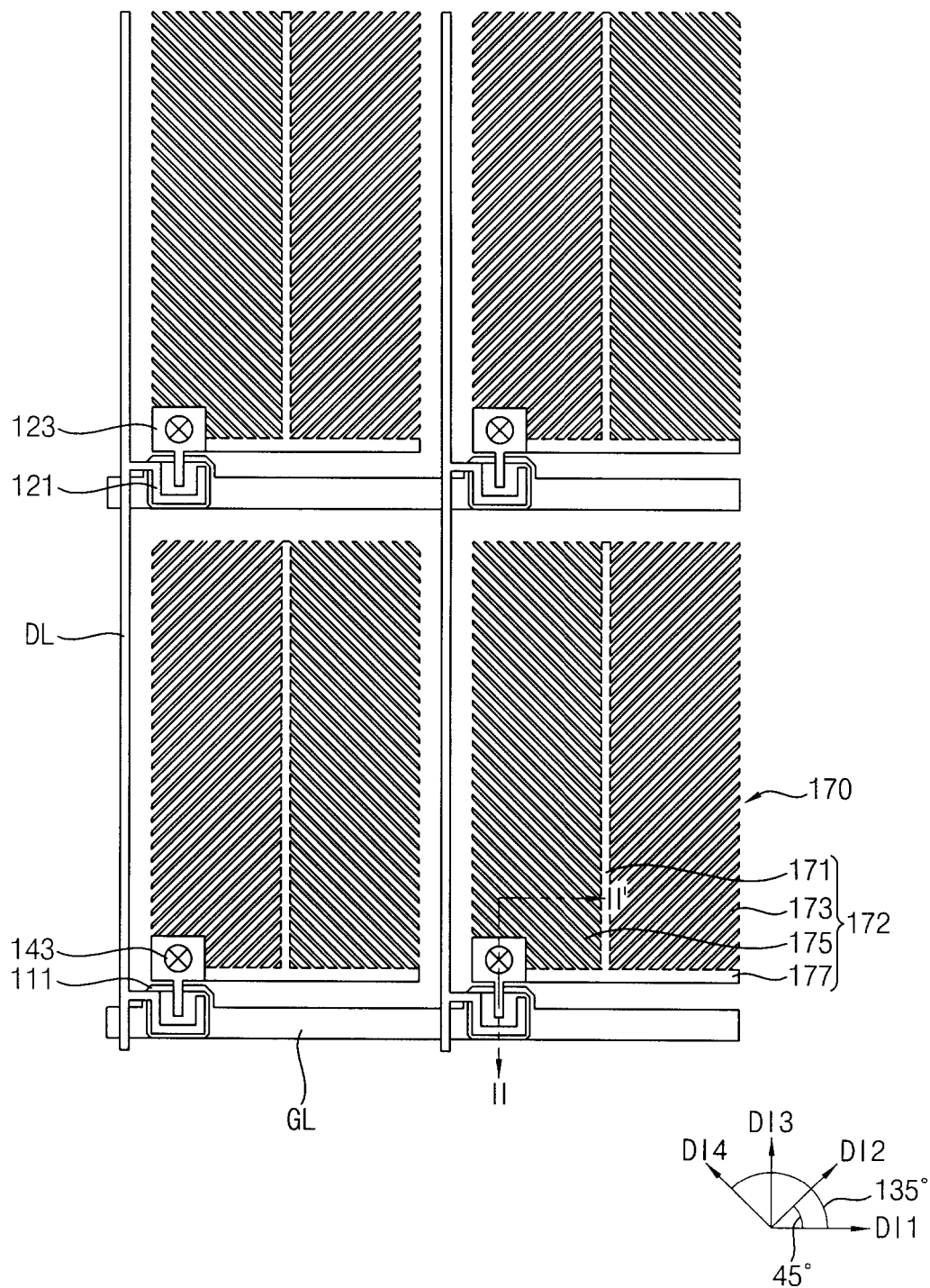
FIG. 1 is a plan view of a display device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2:
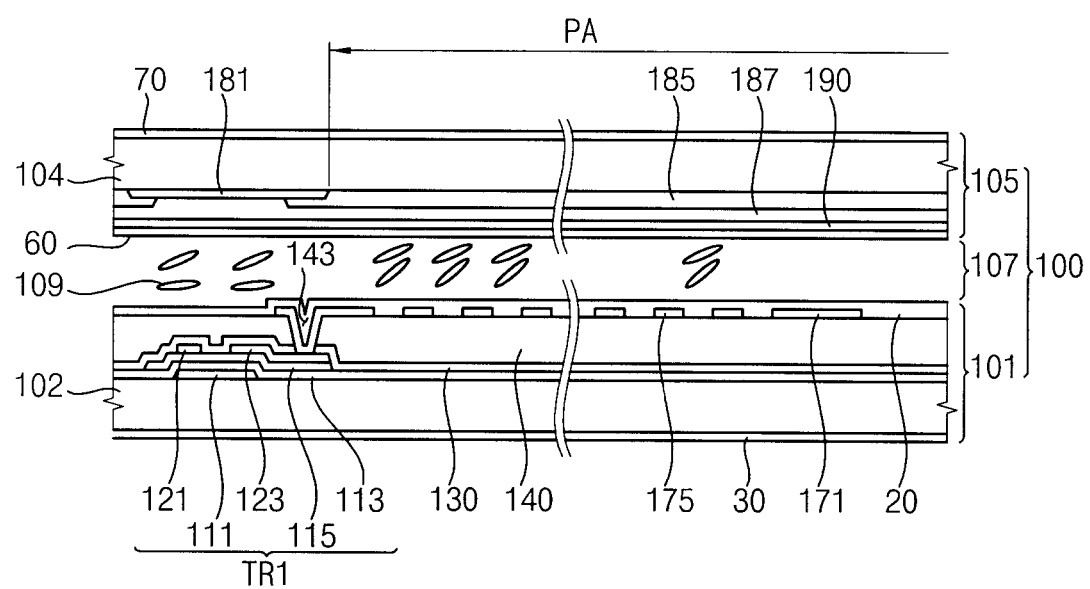
FIG. 2 is a partial cross-sectional view taken along line I-I' of FIG. 1.

FIG. 1 is a plan view of a display device according to an exemplary embodiment of the present invention. FIG. 2 is a partial cross-sectional view taken along line I-I' of FIG. 1.

Referring to FIGS. 1 and 2, a display device 100 includes an array substrate 101, an opposite substrate 105 and a liquid crystal layer 107. The liquid crystal layer 107 includes liquid crystal molecules 109 disposed therein.

In FIG. 1, a plan view of the array substrate 101 is illustrated for purposes of description herein. In FIG. 2, a partial cross-sectional view of the array substrate 101, the opposite substrate 105 and the liquid crystal layer 107 are illustrated for purposes of description herein.

Figure 3:
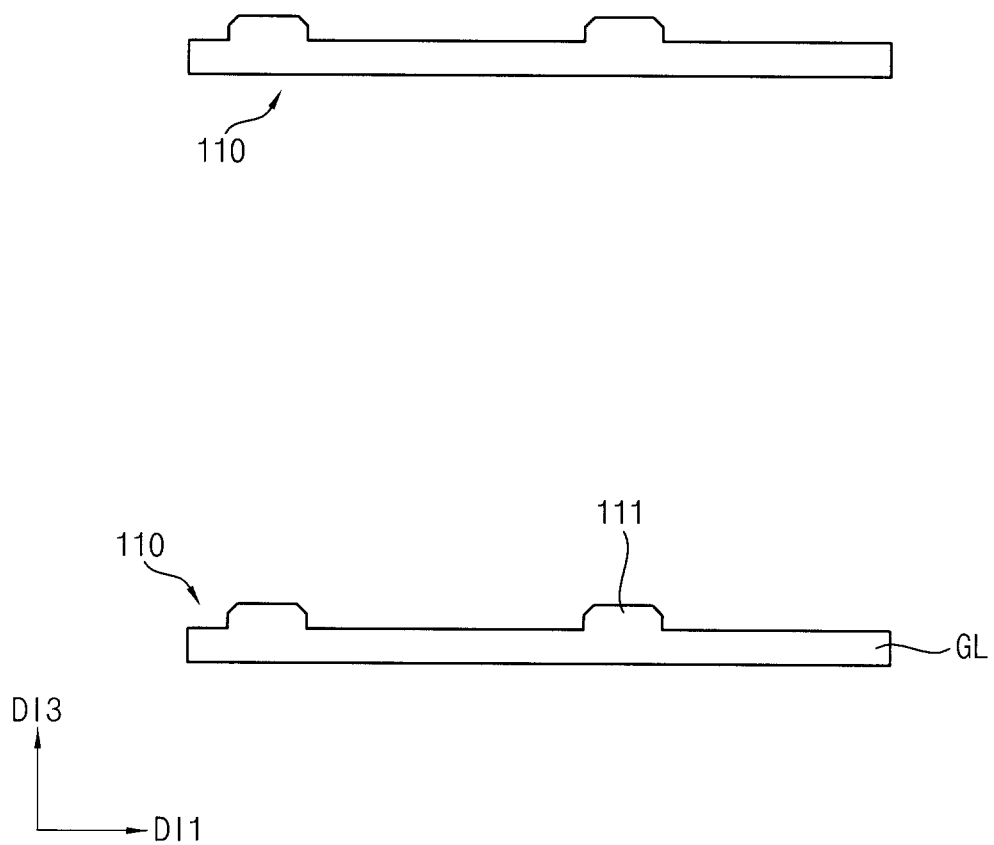
FIGS. 3 and 4 are plan views illustrating a method of manufacturing the array substrate according to the exemplary embodiment of the present invention shown in FIG. 1.
Figure 4:
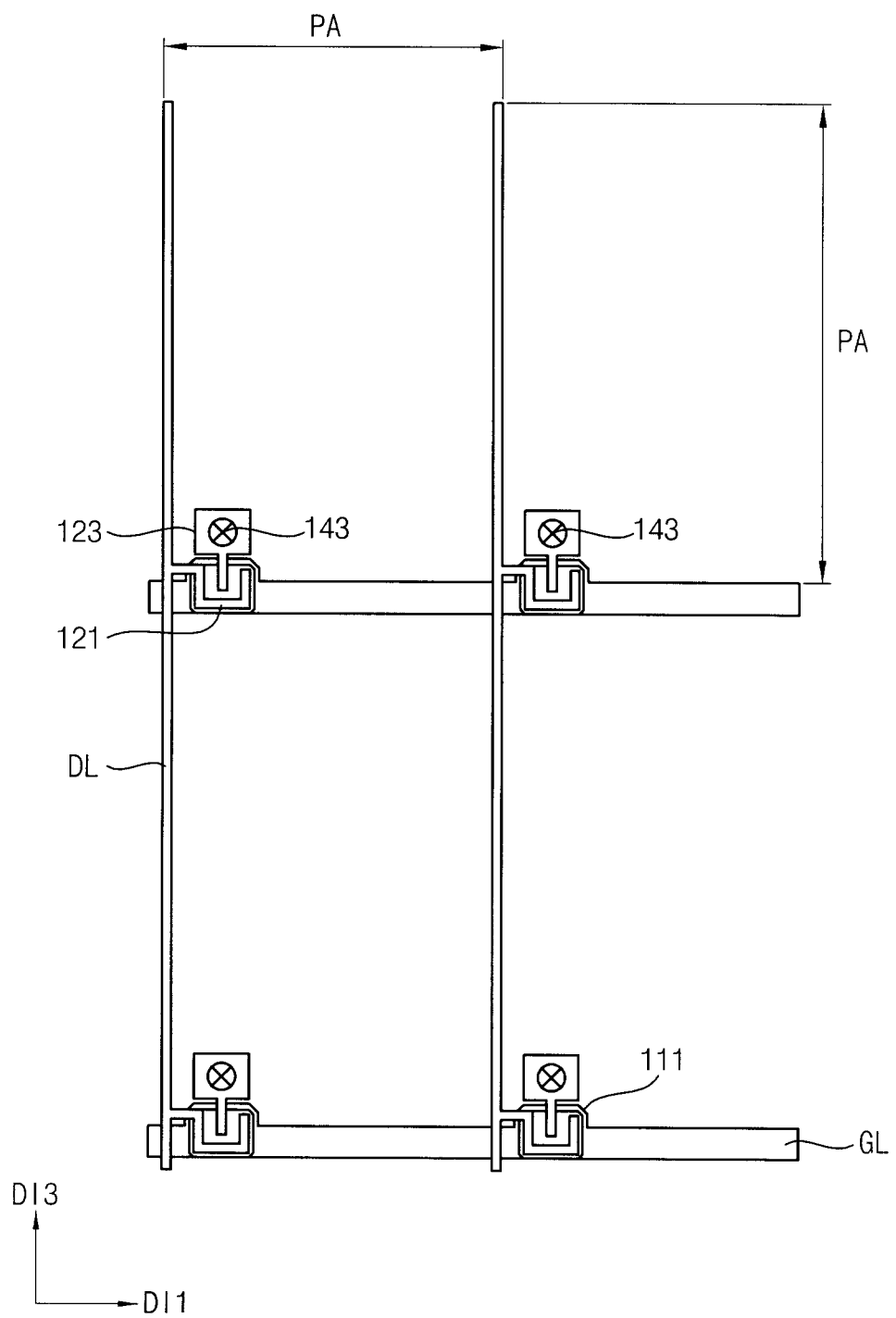

FIGS. 3 and 4 are plan views illustrating a method of manufacturing the array substrate 101.

Referring to FIGS. 1-4, the array substrate 101 includes a base substrate 102, a plurality of gate lines GL, a plurality of data lines DL, a first switching element TR1 and a pixel electrode 170 including a first sub-pixel electrode and a second subpixel electrode corresponding to a first slit pattern 173 and a second slit pattern 175, respectively, as will be described in further detail below.

In an exemplary embodiment of the present invention, a gate metal 110 (FIG. 3) is deposited on the base substrate 102 (FIG. 2) of a glass material, for example, and the gate metal deposited on the base substrate 102 is etched to form gate lines GL of the plurality of gate lines GL, as shown in FIG. 3. In an exemplary embodiment, the gate lines GL extend in a first direction DI1, e.g., a substantially row direction DI1, on the base substrate 102. A portion of each of the gate lines GL forms a gate electrode 111 having a protrusion shape. As shown in FIG. 2, a gate insulation layer 113 is formed to cover the gate lines GL.

In an exemplary embodiment, a semiconductor layer (not fully shown) and a source metal layer (not fully shown) are formed on the gate insulation layer 113, and the semiconductor layer and the source metal layer are etched to form data lines DL of the plurality of data lines DL, a channel layer 115 and a drain electrode 123, as shown in FIGS. 2 and 4. In an exemplary embodiment, the date lines DL extend in a second direction DI3, e.g., a substantially column direction DI3 substantially perpendicular to the first direction DI1, on the gate insulation layer 113. A source electrode 121 protrudes from the data line DL proximate to a region wherein the gate line GL and the data line DL meet to overlap at least a portion of the gate electrode 111. The drain electrode 123 is spaced apart from the source electrode 121 in an area substantially corresponding to the gate electrode 111, and a portion of the drain electrode 123 extends toward a pixel area PA (FIG. 2).

In an exemplary embodiment, the gate lines GL and the data lines DL cross each other to define a substantially rectangular shape. In addition, the pixel electrode 170 according to an exemplary embodiment is disposed in the substantially rectangular area. Thus, in an exemplary embodiment of the present invention, the substantially rectangular area may be defined as the pixel area PA (best shown in FIG. 2).

As shown in FIG. 2, the semiconductor layer and the source metal layer are etched using a single etching process, for example, such that the semiconductor layer is formed below the data line DL, the source electrode 121 and the drain electrode 123, and is formed on the gate electrode 111. The semiconductor layer between the source electrode 121 and the drain electrode 123 defines the channel layer 115.

In an exemplary embodiment, the gate electrode 111, the gate insulation layer 113, the channel layer 115, the source electrode 121 and the drain electrode 123 define the first switching element TR1.

Still referring to FIG. 2, a passivation layer 130 is formed to substantially cover the base substrate 102 having the data line DL formed thereon, and an organic insulation layer 140 is formed on the passivation layer 130. A contact hole 143 exposing a portion of the drain electrode 123 is formed on the organic insulation layer 140 and the passivation layer 130.

Furthermore, an optically transparent and electrically conductive material layer such as indium tin oxide ("ITO") or indium zinc oxide ("IZO"), for example, is deposited on the organic insulation layer 140. The optically transparent and electrically conductive material layer contacts the drain electrode 123 through the contact hole 143. The optically transparent and electrically conductive material layer is etched to form the pixel electrode 170, as shown in FIG. 1. A slit pattern 172 is formed on the pixel electrode 170. Specifically, the slit pattern 172 according to an exemplary embodiment of the present invention includes the first slit pattern 173 and the second slit patter 175 corresponding to the first sub-pixel electrode and the second sub-pixel electrode, respectively, on the pixel electrode 170.

As shown in FIG. 2, a lower alignment layer 20 is formed to substantially cover the pixel electrode 170, and a lower polarization plate 30 is disposed on a rear surface of the base substrate 102 to manufacture the array substrate 101 according to an exemplary embodiment of the present invention.

The lower alignment layer 20 aligns the liquid crystal molecules 109 of the liquid crystal layer 107 in a substantially vertical direction, e.g., longitudinally aligned toward the opposite substrate 105 from the array substrate 101.

A lower polarization axis of the lower polarization plate 30 is disposed to be substantially parallel with the row direction DI1. A plurality of slits, which crosses the upper polarization axis by about 45 degrees or, alternatively, about 135 degrees, is formed on the pixel electrode 170, to define the first slit pattern 173 and the second slit pattern 175, respectively, of the first sub-pixel and the second sub-pixel, respectively, as shown in FIG. 1.

Figure 5:
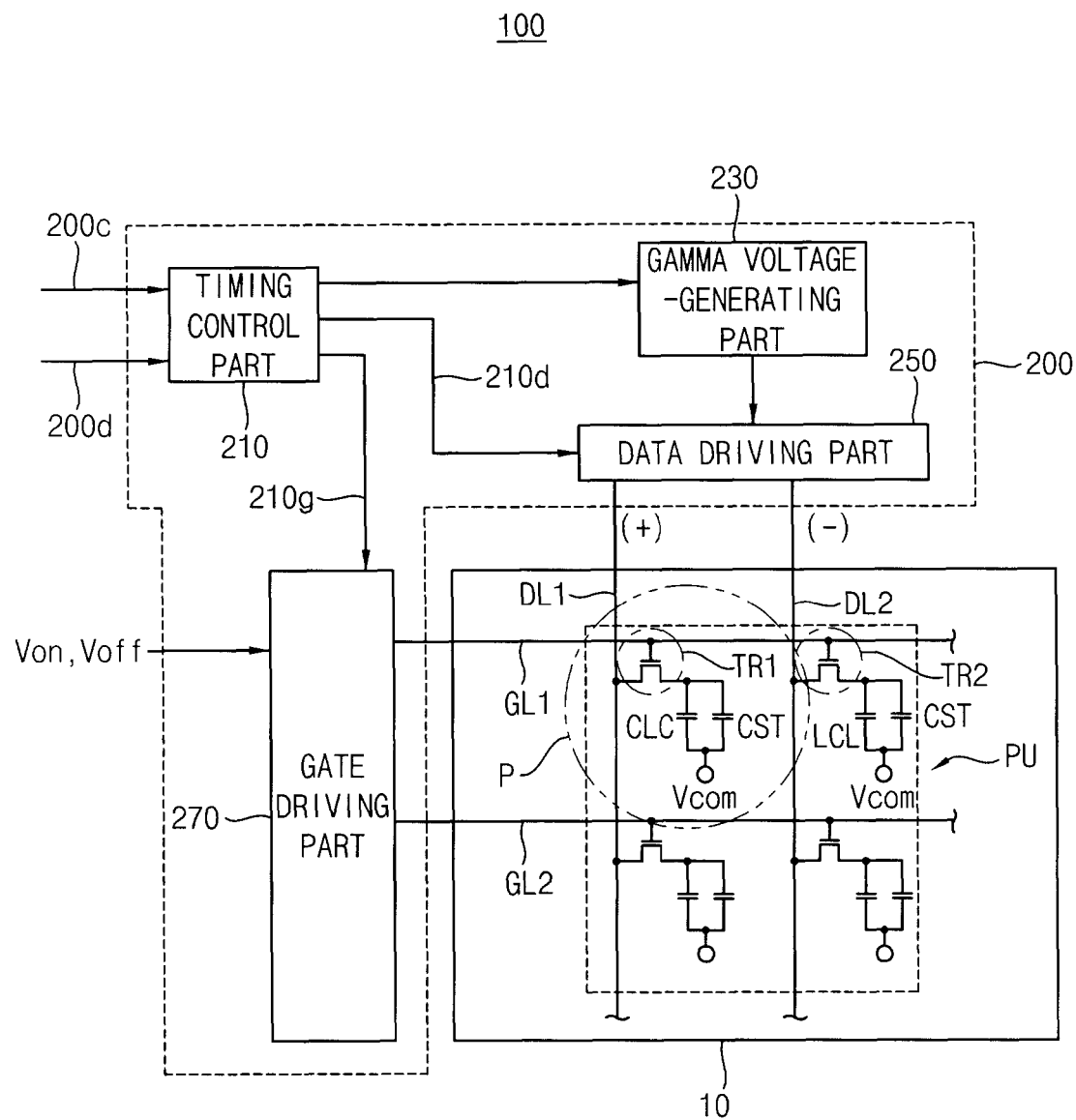
FIG. 5 is a block diagram of the display device according to the exemplary embodiment of the present invention shown in FIG. 1.

In an exemplary embodiment of the present invention, the first switching element TRI and the pixel electrode 170 having the first sub-pixel electrode and the second sub-pixel electrode define a unit pixel P (FIG. 5). Four unit pixels P adjacent to each other are disposed in a substantially matrix shape having two rows and two columns to form a pixel unit PU, as best shown in FIG. 5.

Referring again to FIG. 2, the opposite substrate 105 includes an upper substrate 104, a light-blocking pattern 181, a color filter pattern 185, an overcoating layer 187, a common electrode 190, an upper alignment layer 60 and an upper polarization plate 70.

The light-blocking pattern 181 is disposed on the upper substrate 104 corresponding to the gate line GL, the data line DL, the first switching element TR1 and a storage electrode (not shown). Thus, the color filter pattern 185 is disposed in the pixel area PA on which the light-blocking pattern 181 is not disposed. The color filter pattern 185 may include, for example, a red color filter, a green color filter and/or a blue color filter. The red, green and blue color filters may be sequentially disposed at each unit pixel P in the row direction DI1. The overcoating layer 187 covers the color filter pattern 185 and the light-blocking pattern 181. The common electrode 190 is disposed on the overcoating layer 187. The upper alignment layer 60 is disposed on the common electrode 190 to vertically align the liquid crystal molecules 109 of the liquid crystal layer 107. In an exemplary embodiment, a polarization axis of the upper polarization plate 70 may be substantially perpendicular to the polarization axis of the lower polarization plate 30.

Referring again to FIGS. 1 and 2, the pixel electrode 170 is patterned to have the slit pattern 172. Further, the liquid crystal molecules 109 are vertically aligned in the display device 100 according to an exemplary embodiment of the present invention. Thus, the display device 100 includes a plurality of domains.

In an exemplary embodiment, the pixel unit PU is defined as a unit pixel P set having a predetermined category of domains to be utilized in the display device 100. Thus, the pixel unit PU includes a plurality of unit pixels P. In an exemplary embodiment, the pixel unit PU includes four unit pixels P arranged in a substantially matrix shape having two rows and two columns, as shown in FIG. 5.

The slit pattern 172 formed in the pixel electrode 170 aligns a direction of the liquid crystal molecules 109 in a substantially uniform direction. In the pixel unit PU, each of the unit pixels P is disposed to have an alignment direction different from alignment direction of a liquid crystal arrangement direction of pixel electrodes 170 adjacent to a given unit pixel P, as shown in FIG. 1.

In an exemplary embodiment, for example, each unit pixel P includes two domains formed by the slit pattern 172. Based on the slit pattern 172, the pixel electrode 170 may have a critical shape. In an exemplary embodiment of the present invention, the slit pattern 172 may include a longitudinal electrode bar 171, the first slit pattern 173 and the second slit pattern 175.

The longitudinal electrode bar 171 forms a boundary between two adjacent domains substantially parallel to the data line DL. More specifically, the pixel area PA according to an exemplary embodiment of the present invention may be divided by the longitudinal electrode bar 171 into a left domain and a right domain.

The first slit pattern 173 is connected to the longitudinal electrode bar 171 and extends therefrom in a first oblique direction DI2, forming an angle of about 45 degrees with the row direction DI1, as shown in FIG. 1. The second slit pattern 175 is connected to the longitudinal electrode bar 171 and extends therefrom in a second oblique direction DI4 substantially perpendicular to the first slit pattern 173, e.g., about 135 degrees from the row direction DI1.

In an exemplary embodiment, a slit width of each of the first slit pattern 173 and the second slit pattern 175 is less than a thickness of the liquid crystal layer 107. The first slit pattern 173 and the second slit pattern 175 control the alignment direction of the liquid crystal molecules 109, such that the alignment direction of the liquid crystal molecules 109 is aligned toward the longitudinal electrode bar 171.

The pixel electrode 170 according to an exemplary embodiment of the present invention may further include a horizontal electrode bar 177. The horizontal electrode bar 177 is disposed substantially perpendicular to the longitudinal electrode bar 171 proximate to a given gate line GL, and is electrically connected to the drain electrode 123 of the switching element TR1 through the contact hole 143.

In four adjacent unit pixels P, a sequence of disposing the first slit pattern 173 and the second slit pattern 175 is changed, e.g., is alternated, to have various sequences. In an exemplary embodiment shown in FIG. 1, for example, the second slit pattern 175 and the first slit pattern 173 are sequentially alternately disposed in a first row, first column and a second row, second column unit pixel, e.g., along the row direction DI1 and the column direction DI2. Likewise, the first slit pattern 173 and the second slit pattern 175 are sequentially alternately disposed at a second row, first column and a first row, second column unit pixel e.g., along the row direction DI1 and the column direction DI2.

Thus, the pixel unit PU according to an exemplary embodiment may have four liquid crystal alignment directions according an arrangement of each of the first slit patterns 173 and the second slit patterns 175 disposed in the unit pixel PU. In addition, the pixel electrode 170 receives different pixel voltages having different voltage levels (as will be described in further detail below), and the display device 100 according to an exemplary embodiment of the present invention therefore includes eight domains in a pixel unit PU. As described in greater detail above, a domain is defined as a region where a given group of the liquid crystal molecules 109 have a same alignment direction.

Hereinafter, a method of driving the display device 100 having the eight domains according to an exemplary embodiment of the present invention to display an image using the pixel unit PU will be described in further detail with reference to FIGS. 5 and 6.

FIG. 5 is a block diagram the display device 100 according to the exemplary embodiment of the present invention shown in FIG. 1. FIG. 6 is a graph of gray scale versus luminance showing gamma curves of a driving apparatus of the display device according to the exemplary embodiment of the present invention shown in FIG. 5. The same reference characters in FIGS. 5-6 refer to the same or like components as in FIGS. 1-4, and any repetitive detailed description thereof will hereinafter be omitted.

Figure 6:
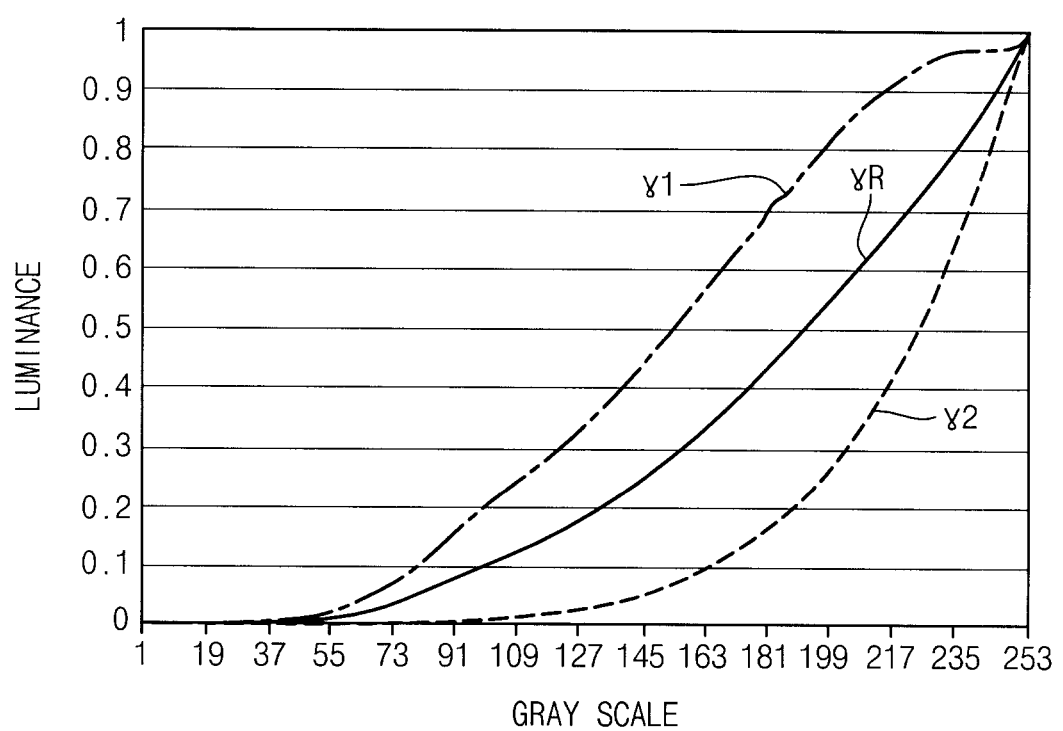
FIG. 6 is a graph of gray scale versus luminance showing gamma curves of a driving apparatus of the display device according to the exemplary embodiment of the present invention shown in FIG. 5.

Referring to FIGS. 5 and 6, the display apparatus 100 according to an exemplary embodiment of the present invention further includes a driving apparatus 200. A plurality of the pixel units PU, each including a plurality of the unit pixels P, is arranged in a substantially matrix pattern in the row direction DI1 (FIG. 1) and the column direction DI3 (FIG. 1). Each of the unit pixels P is driven by a data signal and a gate signal delivered by a first data line DL1 and a first gate line GL1, respectively.

Thus, the pixel unit PU including the unit pixels P arranged in two rows and two columns therein is driven by data signals and gate signals delivered by the first data line DL1 and a second data line DL2 and the first gate line GL1 and a second gate line GL2, respectively.

In an exemplary embodiment of the present invention, the unit pixel P in the first row and the first column includes the first switching element TR1, a liquid crystal capacitor CLC and a storage capacitor CST. Likewise, the unit pixel P in the first row and the second column includes a second switching element TR2, as well as a liquid crystal capacitor CLC and a storage capacitor CST The first switching element TR1 includes, as described in greater detail above, the gate electrode 111 electrically connected to the first gate line GL1, the source electrode 121 electrically connected to the first data line DL1 and the drain electrode 123 electrically connected to a first terminal of the liquid crystal capacitor CLC.

The unit pixels P arranged in the row direction DI1 receive data signals having dual polarity. For example, the unit pixel P in the first row, first column may receive a positive polarity data signal (hereinafter, a first pixel voltage) with respect to a reference voltage Vcom, while the unit pixel P in the second row, first column may receive a negative polarity data signal (hereinafter, a second pixel voltage) with respect to the reference voltage Vcom.

In an exemplary embodiment of the present invention, the first pixel voltage is defined as a pixel voltage at a high level greater than a gradation of an image displayed by the unit pixels P, and the second pixel voltage is defined as a pixel voltage at a low level lower than the gradation of the image.

The driving apparatus 200 includes a timing control part 210, a gamma voltage-generating part 230, a data driving part 250 and a gate driving part 270.

The timing control part 210 receives a control signal 200c and data 200d from an external device (not shown). The timing control part 210 generates a plurality of timing control signals which controls a driving timing of the data driving part 250 and the gate driving part 270 based on the control signal 200c. Hereinafter, a timing control signal corresponding to the data driving part 250 will be denoted as a data control signal 210d, and a timing control signal corresponding to the gate driving part 270 will be denoted as a gate control signal 210g. The timing control part 210 outputs the data control signal 210d and the gate control signal 210g to the data driving part 250 and the gate driving part 270, respectively. The timing control part 210 may provide the gamma voltage-generating part 230 with the data 200d received from an external device (not shown).

The gamma voltage-generating part 230 converts the data provided from the timing control part 210 into first gamma data and second gamma data corresponding to a first gamma curve 71 and a second gamma curve γ2, respectively, (FIG. 6).

In gamma curves γ1, γ2 and γR, as shown in FIG. 6, the x-axis represents a gray scale (e.g., of 256 gray scales), and the y-axis represents a luminance (e.g., a light transmittance percentage). Specifically, a reference gamma curve γR is a gamma curve optimized for front visibility, and first and second gamma curves γ1 and γ2, respectively, are gamma curves optimized for side visibility.

Based on the data received from the timing control part 210, the gamma voltage-generating part 230 generates first gamma data corresponding to the first gamma curve γ1 during a first interval, and generates second gamma data corresponding to the second gamma curve γ2 during a second interval. The first interval may be an interval into which unit pixels P of odd-numbered rows are charged, and the second interval may be an interval into which unit pixels P of even-numbered rows are charged.

The data driving part 250 converts the first gamma data and the second gamma data generated from the gamma voltage-generating part 230 into data voltages of an analog type to provide the first data line DL1 and the second data line DL2 of the array substrate 101 with the data voltages.

Specifically, the data driving part 250 converts the first and second gamma data generated from the gamma voltage-generating part 230 into analog data voltages. More specifically, the data driving part 250 provides the first data line DL1 of the display panel 100 with a first data voltage. The data driving part 250 provides the second data line DL2 of the display panel 100 with a second data voltage having a phase opposite to a phase of the first data voltage applied to the first data line DL1. In an exemplary embodiment of the present invention, for example, when a reference voltage is 0 V and a first data voltage that is applied to the first data line DL1 is +5 V, a second data voltage of −5 V is applied to the second data line DL2.

The gate driving part 270 generates a gate pulse based on the gate control signal 210g provided from the timing control part 210, a gate on voltage Von and a gate off voltage Voff provided from an external device (not shown). In an exemplary embodiment, for example, the gate driving part 270 applies a gate pulse corresponding to the gate on voltage Von to the first gate line GL1 during the first interval, and again applies the gate pulse to the first gate line GL1 during the second interval. That is, two gate pulses are applied to the first gate line GL during one frame.

Figure 7:
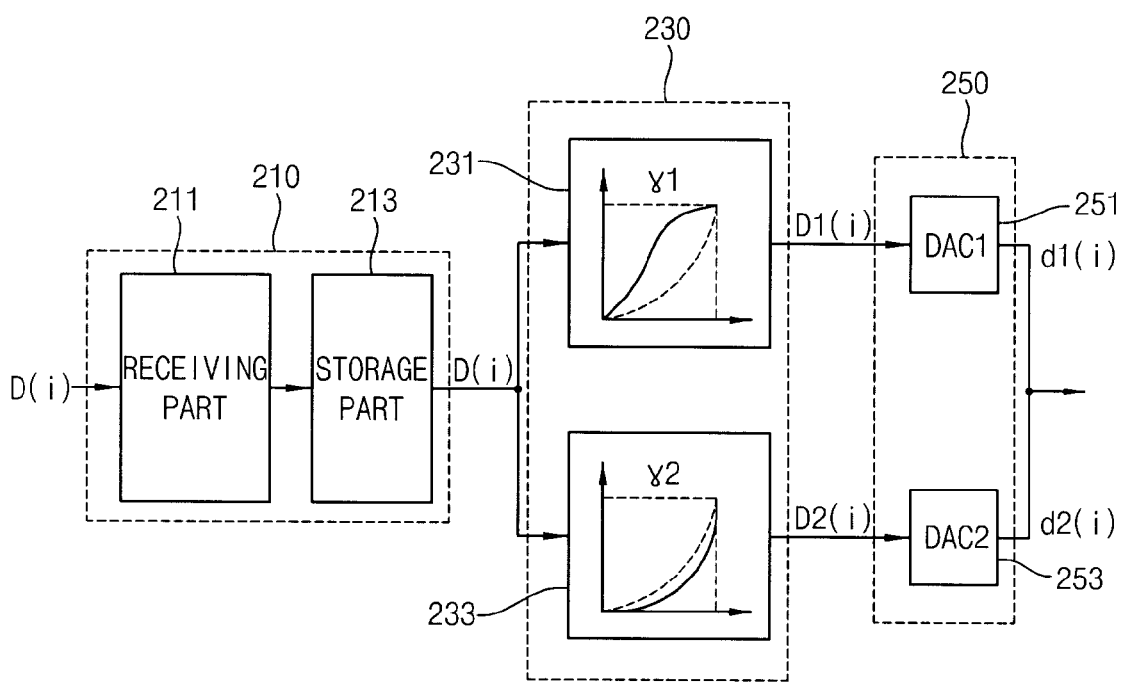
FIG. 7 is a block diagram of the driving apparatus of the display device according to the exemplary embodiment of the present invention shown in FIG. 5.

FIG. 7 is a block diagram of the driving apparatus of the display device according to the exemplary embodiment of the present invention shown in FIG. 5.

Referring now to FIGS. 1 and 5-7, the timing control part 210 includes a receiving part 211 and a storage part 213. The receiving part 211 receives data D(i) from an external device (not shown). The received data D(i) is stored in the storage part 213. The storage part 213 may be, for example, a line memory which stores line data corresponding to a plurality of unit pixels P arranged in the row direction DI1 on the display panel 100.

The gamma voltage-generating part 230 includes a first buffer 231 and a second buffer 233. The first buffer 231 stores first gamma data D1(i) to which the first gamma curve 71 has been applied, and the second buffer 233 stores second gamma data D2(i) to which the second gamma curve 72 has been applied. In an exemplary embodiment, the gamma voltage-generating part 233 includes the first buffer 231 and the second buffer 233 which store the first gamma data D1(i) and the second gamma data D2(i), respectively. Alternatively, the gamma voltage-generating part 233 according to an exemplary embodiment of the present invention may include a resistor string (not shown) to which the first and second gamma curves γ1 and γ2 have been applied.

The gamma voltage-generating part 230 converts the data D(i) into the first gamma data D1(i) to which the first gamma curve 71 has been applied during the first interval, and converts the data into the second gamma data D2(i) to which the second gamma curve γ2 has been applied during the second interval.

Figure 8:
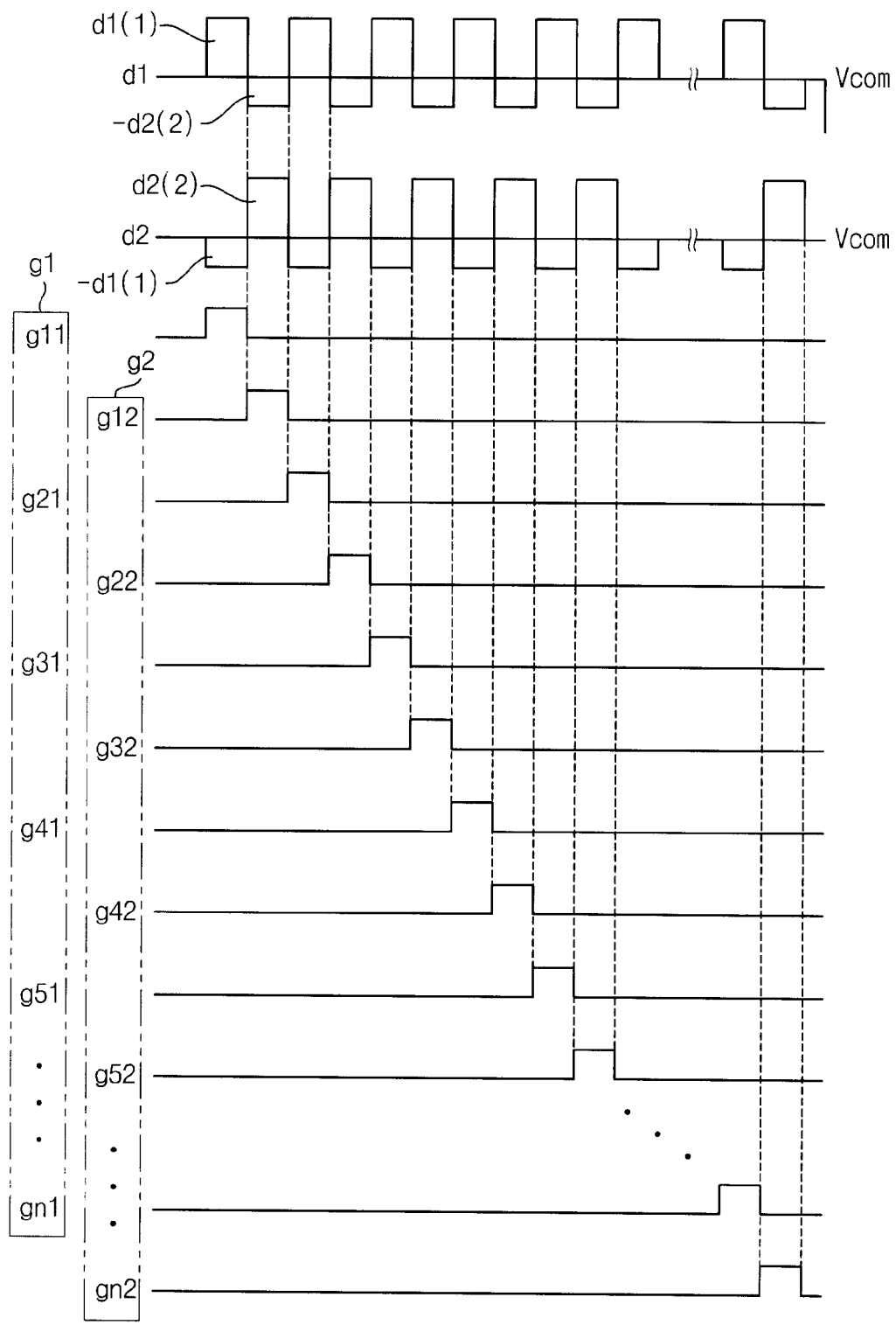
FIG. 8 is a signal timing diagram showing driving signals of the display device according to the exemplary embodiment of the present invention shown in FIG. 5.

The data driving part 250 includes a first digital-to-analog converter ("DAC") 251 and a second DAC 253. In an exemplary embodiment of the present invention, the data driving part 250 further includes an inverting amplifier (not shown). The first DAC 251 converts the first gamma data D1(i) received from the first buffer 231 into a first data signal d1(i) of an analog type. The second DAC 253 converts the second gamma data D2(i) received from the second buffer 233 into a second data signal d2(i) of an analog type. The inverting amplifier (not shown) outputs a first inverted data signal −d1(i) (FIG. 8) and a second inverted data signal −d1(i) (FIG. 8). The first inverted data signal −d1(i) has a phase opposite to that of the first data signal d1(i) applied from the first DAC 251. The second inverted data signal −d2(i) has a phase opposite to that of the second data signal d2(i) applied from the second DAC 253.

FIG. 8 is a signal timing diagram showing driving signals of the display apparatus of the display device according to the exemplary embodiment of the present invention shown in FIG. 5.

Referring to FIGS. 1, and 5-8, a method of driving the display panel 100 for one frame will be described. In an exemplary embodiment, the display panel 100 includes m vertical pixel rows and n horizontal pixel rows (wherein m and n are natural numbers). A driving method of an (i)-th pixel row, unit pixels P thereof being connected to the first data line DL1 and the second data line DL2 (FIG. 5) will be described (wherein i is a natural number and i<m).

During the first interval, the data driving part 250 applies the first data signal d1, to which the first gamma curve γ1 has been applied, to the first data line DL1, and applies the first inverted data signal −d1, having a phase opposite to a phase of the first data signal d1, to the second data line DL2. Then, during the second interval, the data driving part 250 applies the second data signal d2, to which the second gamma curve γ2 has been applied, to the second data line DL2, and applies the second inverted data signal −d2, having a phase opposite to a phase of the second data signal d2, to the first data line DL1.

The gate driving part 270 sequentially applies a gate signal having a first gate pulse g1 and a second gate pulse g2 to n gate lines GL during one frame. More specifically, the gate driving part 270 applies the first gate pulse g1 to the gate lines GL during the first interval, and applies the second gate pulse g2 to the gate lines GL during the second interval.

In an exemplary embodiment, for example, during the first interval, the data driving part 250 applies the first data signals d1(1), d1(2), d1(3), . . . , d1(n) corresponding to first through n-th unit pixels P of the (i)-th pixel row to the first data line DL1, and applies the first inverted data signal −d1(1), −d1(2), −d1(3), . . . , −d1(n) having a phase opposite to a phase of the first data signals d1(1), d1(2), d1(3), . . . , d1(n) to the second data line DL2.

The gate driving part 270 sequentially applies the first gate pulses g11, g21, g31, gn1 to the n gate lines GLn during the first interval. During the first interval, the first switching element TR1 and the second switching element TR2 are turned on by the first gate pulse g1, such that the (i)-th pixel row displays an image to which the first gamma curve γ1 has been applied (wherein i<m).

Then, during the second interval, the data driving part 250 applies the second data signals d2(1), d2(2), d2(3), . . . , d2(n) corresponding to the first through n-th unit pixels P of the (i)-th pixel row to the first data line DL1, and applies the second inverted data signal −d2(1), −d2(2), −d2(3), . . . , −d2(n), having a phase opposite to a phase of the second data signals d2(1), d2(2), d2(3), . . . , d2(n) to the second data line DL2.

The gate driving part 270 sequentially applies the second gate pulses g12, g22, g32, . . . , gn2 to the n gate lines GLn during the second interval. During the second interval, the first switching element TRI and the second switching element TR2 are turned on by the second gate pulse g2, such that the (i)-th pixel row displays an image to which the second gamma curve γ2 has been applied (wherein i<m).

As a result, two unit pixels P adjacent to each other (in the column direction DI3) display a gradation for displaying the image. In addition, the unit pixels P of odd-numbered rows may be driven by dot inversion by the first pixel voltage. The unit pixels P of even-numbered rows may be driven by dot inversion by the second pixel voltage.

Therefore, the driving apparatus 200 alternatively applies the first pixel voltage and the second pixel voltage to each unit pixel P to realize eight domains, e.g., twice the number of the four liquid crystal alignment directions of the pixel unit PU. Thus, side visibility of the display panel 100 according to an exemplary embodiment of the present invention is substantially enhanced without requiring additional components such as additional gate lines, additional data lines or additional switching elements, for example.

Generally, to form a plurality of domains within a unit pixel in a super patterned vertical alignment ("SPVA") mode according to the prior art, for example, the pixel electrode includes slits having four directions formed thereon is formed in one unit pixel, and a charge-sharing driving method is used, so that eight domains may be realized. However, the above-mentioned configuration requires additional switching elements and additional gate lines and data lines in the unit pixel, and an aperture ratio of a pixel is thereby decreased in the display device according to the prior art.

In the display device 100 according to an exemplary embodiment of the present invention, however, eight domains are realized in the pixel unit PU including four unit pixels P. Thus, to realize the multi-domain structure, the display device 100 uses the pixel unit PU including the unit pixels P rather than one pixel area PA. Thus, eight domains are realized while the number of the switching elements formed in the unit pixel P is decreased, and the number of gate lines and data lines formed in the unit pixel P are also decreased. Therefore, an aperture ratio of the pixel according to an exemplary embodiment of the present invention is substantially increased.

Figure 9:
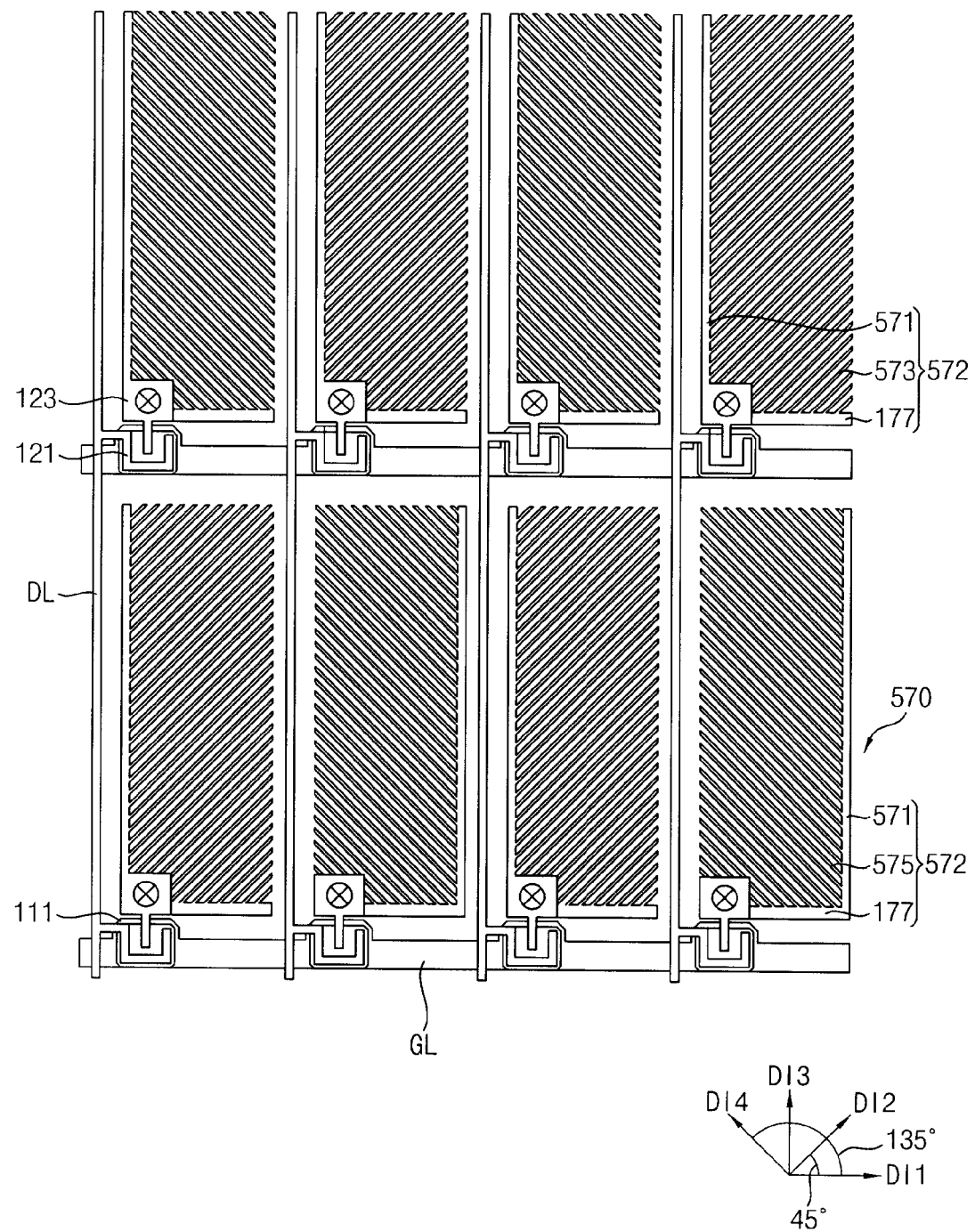
FIG. 9 is a plan view illustrating a display device according to an alternative exemplary embodiment of the present invention.

FIG. 9 is a plan view illustrating a display device 500 according to an exemplary embodiment of the present invention.

In an exemplary embodiment, portions of the display device 500 are substantially the same as those of the display device 100 as described in greater detail above with reference to FIGS. 1 to 8. Thus, the same reference numerals are used in FIG. 9 to refer to the same or like components in FIGS. 1 to 8, and thus, any repetitive detailed description thereof will hereinafter be omitted.

In an exemplary embodiment, the array substrate 101 (FIG. 2) is substantially the same as the array substrate 101 of FIGS. 1 to 4 except for the pixel unit PU (FIG. 5) includes eight unit pixels P arranged in a substantially matrix pattern of two rows and four columns, as shown in FIG. 9.

In addition, slit patterns 572 of a pixel electrode 570 formed in each of the unit pixels P correspond to a single domain, as shown in FIG. 9.

The pixel electrode 570 according to an exemplary embodiment includes at least one of a longitudinal electrode bar 571, a first slit pattern 573 and a second slit pattern 575. The longitudinal electrode bar 571 is disposed substantially adjacent to a data line DL and substantially parallel to the data line DL. The first slit pattern 573 extends in the first oblique direction DI2 to cross the row direction DI1 at an angle of about 45 degrees to connect to the longitudinal electrode bar 571. The second slit pattern 575 extends in the second oblique direction DI4 to cross the row direction DI1 at an angle of about 135 degrees to connect to the longitudinal electrode bar 571. The first slit pattern 572 and the second slit pattern 575 control an alignment direction of the liquid crystal molecules 109 (FIG. 2), and an alignment direction of the liquid crystal molecules 109 is thereby aligned toward the longitudinal electrode bar 571.

A longitudinal electrode bar 571 corresponding to a first row of unit pixels P is disposed near a left peripheral side data line DL, and a longitudinal electrode bar 571 corresponding to a second row of unit pixels P is disposed near a right peripheral side data line DL, as shown in FIG. 9. The first slit pattern 573 and the second slit pattern 575 are disposed in an alternating arrangement in the row direction DI1 and the column direction DI3.

A driving method of the display device 500 according to an exemplary embodiment is substantially the same as the driving method described in greater detail above with reference to FIGS. 5 to 8 when eight unit pixels P disposed in two rows and four columns included in the pixel unit PU are divided into two rows and two columns. Thus, a repetitive detailed description thereof has been omitted.

Thus, in an array substrate and a display device having the same in accordance with exemplary embodiments of the present invention as described herein, an aperture ratio and a viewing angle of a unit pixel are both substantially improved and/or enhanced. Therefore, the display device according to an exemplary embodiment of the present invention provides a substantially improved display quality.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. An array substrate comprising:
    a base substrate;
    a gate line extending in a first direction on the base substrate;
    a first data line extending in a second direction crossing the first direction on the base substrate;
    a second data line disposed in parallel with the first data line;
    a first unit pixel comprising:
        a first switching element connected to the gate line and the first data line; and
        a first pixel electrode having a first longitudinal electrode bar disposed on the base substrate in the second direction connected to the first switching element, the first pixel electrode having a first horizontal electrode bar disposed on the base substrate in the first direction proximate to the gate line, the first horizontal electrode bar electrically connected to an output electrode of the first switching element, and the first pixel electrode having one or more domains;
    a second unit pixel disposed adjacent to the first unit pixel comprising:
        a second switching element connected to the gate line and the second data line; and
        a second pixel electrode having a second longitudinal electrode bar disposed on the base substrate in the second direction connected to the second switching element, the second pixel electrode having a second horizontal electrode bar disposed on the base substrate in the first direction proximate to the gate line, the second horizontal electrode bar electrically connected to an output electrode of the second switching element, and the second pixel electrode having one or more domains, and
    wherein the one or more domains adjacent to each other have a different direction of liquid crystal director, each of the first and second unit pixels does not have 4 domains, and a pixel unit comprises the first and second unit pixels to form a multi-domain structure.

2. The array substrate of claim 1, wherein the first pixel electrode comprises:
 a first sub-pixel electrode having first slit patterns formed thereon, the first slit pattern being electrically connected to the first switching element, the first slit patterns being disposed in parallel with each other in a third direction; and
 a second sub-pixel adjacent to the first sub-pixel electrode and having second slit patterns formed thereon, the second slit pattern being electrically connected to the first switching element, the second slit patterns being disposed in parallel with each other in a fourth direction.

3. The array substrate of claim 2, wherein
 the first slit patterns extend in the third direction to connect to the first longitudinal electrode bar; and
 the second slit patterns extend in the fourth direction to connect to the first longitudinal electrode bar.

4. The array substrate of claim 3, wherein the first slit patterns and the second slit patterns are alternately disposed in sequential unit pixels along each of the first direction and the second direction.

5. The array substrate of claim 1, wherein
 eight unit pixels are disposed adjacent to each other in a matrix having two rows and four columns to form a pixel unit.

6. The array substrate of claim 5,
 wherein the first longitudinal electrode bar is disposed in a first row of the matrix adjacent to a left peripheral data line,
 the second longitudinal electrode bar is disposed in a second row of the matrix adjacent to a right peripheral data line, and
 the first slit pattern and the second slit pattern are disposed in an alternating arrangement along each of the row direction and the column direction.

7. A display device comprising:
 an array substrate comprising:
  a base substrate;
  a gate line extending in a first direction on the base substrate;
  a first data line extending in a second direction on the base substrate;
  a second data line disposed in parallel with the first data line;
 a first unit pixel comprising:
  a first switching element electrically connected to the gate line and the first data line; and
  a first pixel electrode having a first longitudinal electrode bar disposed on the base substrate in the second direction connected to the first switching element, the first pixel electrode having a first horizontal electrode bar disposed on the base substrate in the first direction proximate to the gate line, the first horizontal electrode bar electrically connected to an output electrode of the first switching element, and the first pixel electrode having one or more domains;
 a second unit pixel disposed adjacent to the first unit pixel comprising:
  a second switching element electrically connected to the gate line and the second data line; and
  a second pixel electrode having a second ode bar disposed on the base substrate in the second direction connected to the second switching element, the second pixel electrode having a second horizontal electrode bar disposed on the base substrate in the first direction proximate to the gate line, the second horizontal electrode bar electrically connected to an output electrode of the second switching element, the second pixel electrode and the second pixel electrode having one or more domains;
 an opposite substrate comprising a common electrode disposed opposite to the first and second pixel electrodes; and
 a liquid crystal layer disposed between the array substrate and the opposite substrate,
 wherein the one or more domains adjacent to each other have a different direction of liquid crystal director, each of the first and second unit pixels does not have 4 domains, and a pixel unit comprises the first and second unit pixels to form a multi-domain structure.

8. The display device of claim 7, wherein the first pixel electrode comprises:
 a first sub-pixel electrode having first slit patterns formed thereon, the first slit pattern being electrically connected to the first switching element, the first slit patterns being disposed in parallel with each other in a third direction; and
 a second sub-pixel adjacent to the first sub-pixel electrode and having second slit patterns formed thereon, the second slit pattern being electrically connected to the first switching element, the second slit patterns being disposed in parallel with each other in a fourth direction.

9. The display device of claim 8, further comprising a driving apparatus which alternatively applies a first pixel voltage greater than a gradation of an image to the first data line and a second pixel voltage less than the gradation of the image to the second data line, wherein the number of domains displayed by the pixel unit is twice the number of domains of the liquid crystal layer.

10. The display device of claim 9, wherein each of the pixel units forms eight domains having different liquid crystal arrangement directions based on an operation of the driving apparatus.

11. The display device of claim 9, wherein the first longitudinal electrode bar is disposed at a boundary between the first slit patterns and the second slit patterns, wherein
 the first slit pattern and the second slit pattern determine an alignment direction of liquid crystal molecules in the liquid crystal layer, and
 the alignment direction of the liquid crystal molecules toward the first longitudinal electrode bar.

12. The display device of claim 11, wherein a slit width of the first slit patterns and the second slit patterns is less than a thickness of the liquid crystal layer.

13. The display device of claim 11, wherein the first slit patterns and the second slit patterns are sequentially alternately disposed in sequential unit pixels along each of the first direction and the second direction.

14. The display device of claim 13, wherein the driving apparatus drives unit pixels in a first row of the matrix by dot inversion based on the first pixel voltage and unit pixels in a second row of the matrix based on the second pixel voltage to display the image.

15. The display device of claim 9, wherein the opposite substrate further comprises a color filter disposed on the common electrode.

16. The display device of claim 7, wherein
 eight unit pixels are disposed adjacent to each other in a matrix having two rows and four columns to form a pixel unit.

17. The display device of claim 16, wherein the second slit pattern and the first slit pattern are sequentially alternately disposed in the first direction in a first row of the matrix, and the first slit pattern and the second slit pattern are sequentially alternately disposed in the first direction in a second row of the matrix.

* * * * *